(12) United States Patent
Rodrigue et al.

(10) Patent No.: US 7,747,470 B2
(45) Date of Patent: Jun. 29, 2010

(54) SYSTEM AND METHOD TO IMPROVE MANUFACTURING

(75) Inventors: Rodney P. Rodrigue, Celebration, FL (US); Terry Shehata, Winthrop, ME (US); Larry Meadows, Hope, RI (US); Alfredo Stimac, Altamonte Springs, FL (US)

(73) Assignee: Time Wise Solutions, LLC, Morrill, ME (US)

( * ) Notice: Subject to any disclaimer, the term of this patent is extended or adjusted under 35 U.S.C. 154(b) by 959 days.

(21) Appl. No.: 11/106,279

(22) Filed: Apr. 14, 2005

(65) Prior Publication Data

US 2006/0235706 A1  Oct. 19, 2006

(51) Int. Cl.
    *G06Q 30/00* (2006.01)
(52) U.S. Cl. ............... 705/26; 705/1; 705/27; 705/37; 705/400; 716/15; 700/121
(58) Field of Classification Search ............ 705/1, 705/26, 27, 400, 37; 716/15; 700/121
    See application file for complete search history.

(56) References Cited

U.S. PATENT DOCUMENTS

| | | | | |
|---|---|---|---|---|
| 5,375,194 | A * | 12/1994 | Hori et al. | 345/611 |
| 5,568,566 | A * | 10/1996 | Hori et al. | 382/197 |
| 5,721,587 | A * | 2/1998 | Hirose | 348/92 |
| 6,123,312 | A * | 9/2000 | Dai | 248/550 |
| 6,965,877 | B2 * | 11/2005 | Banerjee et al. | 705/37 |
| 7,216,092 | B1 * | 5/2007 | Weber et al. | 705/26 |
| 7,458,055 | B2 * | 11/2008 | Bentley et al. | 716/15 |

(Continued)

FOREIGN PATENT DOCUMENTS

WO  WO 0068849 A1 * 11/2000

OTHER PUBLICATIONS

Business Editors and High Tech Writers (Aug. 8). Autodesk Inventor Beats SolidWorks in Independent 3D Mechanical Design Software Competition; Head-to-Head Shoot-Out Confirms Superiority of Autodesk Inventor. Business Wire,1. Retrieved Jan. 18, 2008, from Business Dateline database. (Document ID: 147483361), hereinafter Autodesk.*

*Primary Examiner*—Yogesh C Garg
(74) *Attorney, Agent, or Firm*—Verrill Dana, LLP; Chris A. Caseiro (57) ABSTRACT

A system and related method for the rapid response to one or more product fabrication bid requests. The system includes a translation function for translating received product information into information suitable for a manufacturer to produce fabrication information. The system further includes a product fabrication function for generating product fabrication setup sheets and programming based on the translated product information. The system also includes a bid preparation function that produces bid information, such as pricing and scheduling, based on the generated product fabrication information. A process that had taken days to complete is finished in minutes. The related method includes the steps of querying a database of available manufacturers for their capability and available equipment to fabricate a desired product. The method also includes the steps of translating received product information into manufacturing information applicable to one or more identified manufacturers, generating product fabrication information specific to the one or more identified manufacturers, and producing responsive bid information based on the generated product fabrication information. A plurality of identified manufacturers may join together to use the system and method to respond to a bid request.

15 Claims, 6 Drawing Sheets

U.S. PATENT DOCUMENTS

2002/0026369 A1* 2/2002 Miller et al. .................. 705/26
2005/0049883 A1* 3/2005 Boroson et al. ................ 705/1
2005/0160016 A1* 7/2005 Schuller ..................... 705/26

* cited by examiner

ABC INC.
SET-UP SHEET

| ABC INC. | | PART FILE | MILL2AX_4.SLDPRT |
|---|---|---|---|
| DATA/TIME | 12/2/2004 11:16 | CNC MACH | MILL MACHINE INCH |
| MATERIAL | 1005 | SETUP# | 1 OF 1 |
| STOCK SIZE | 6.67, 2.73, .91 | PROGRAMMER | |
| SETUP ORIGIN | 2.75, .52, .91 | UNITS | INCHES |
| SETUP NAME | GROUP1 | MACH | 6.8 |

| | |
|---|---|
| TOOL# | 14 |
| OPERATION | ROUGH MILL |
| TOOL DESCRIPTION | 3/8 2 FLUTEHSS |
| HOLDER DESCRIPTION | 1.00DIA X 50 BT |
| HOLDER NUMBER | BT50SF-100-300 |
| SPEED | 200 |
| FEED | 1.25 |
| MACH DEPTH | 0.96 |
| TIP LEN | 47.54 |
| TIME | 2.71 |

| | |
|---|---|
| TOOL# | 9 |
| OPERATION | FINTH MILL |
| TOOL DESCRIPTION | 1/4 2 FLUTEHSS |
| HOLDER DESCRIPTION | 1.00DIA X CAT 50 |
| HOLDER NUMBER | V50SF-100-300 |
| SPEED | 2200 |
| FEED | 3.75 |
| MACH DEPTH | 0.91 |
| TIP LEN | 17.74 |
| TIME | 0.4 |

SYSTEM AND METHOD TO IMPROVE MANUFACTURING

BACKGROUND OF THE INVENTION

1. Field of the Invention

The present invention relates to systems and methods designed to assist small to medium size manufacturers to rapidly respond to competitive bid requests. More particularly, the present invention relates to systems and methods to assist such manufacturers to rapidly evaluate the parameters of a bid project and establish a reasonably accurate estimate of the cost to perform the task in a timely and cost effective manner. The present invention relates to systems and methods to enable manufacturers to optimize productivity.

2. Description of the Prior Art

Goods manufacturers have long been the driving force of much of the country's economy. Small to medium manufacturers have played a central role in that activity. This community is competing in world markets and must strive for benchmarking goods and services as "best in class." One type of manufacturer of interest in regard to the present invention is the machined component parts manufacturer. This type of manufacturer generally uses processes involving the machining and fabrication of metals, sheet metal, and composite materials based upon customer specifications. Machining companies must be prepared, equipped and trained to produce a wide variety of precision parts for companies that design and assemble guidance systems, space communications devices, navigation equipment, pressure vessels, and advanced medical devices, among many others.

However, a competitive global market and substantial pressure to reduce pricing has produced considerable challenge for today's manufacturers. Specific challenges small and medium manufacturers are facing include:

Aggressive competition from the European Market, Mexico and Southeast Asia

Aging ownership of companies without transition plans

Contraction of supply chains by large companies

Stringent supply chain requirements for quality, delivery and cost

The nation's changing demographic that is forcing large companies to diversify their supply chains to reflect their customer base As a result, there has been a substantial decline in the number of such businesses and, relatedly, the number of people employed in this traditional manufacturing sector. As indicated above, the machining sector includes, generally, those organizations that build the parts that go into end-use products, from aircraft to motor vehicles. That job loss may have a detrimental effect on the country's future ability to manufacture supplies that it needs. Further, it may widen existing income gaps between service sector and manufacturing sector jobs, increase competition for low-skill jobs, and reduce the manufacturing sector's competitive edge as the aging skilled workforce is not replaced. Long-term trends indicate that even after the economy has fully recovered from the 2001 recession, employment in manufacturing is unlikely to return to its prerecession level. Over the long term, productivity in manufacturing will continue to increase but sales would have to increase even faster for employment to show any gains.

The competition for manufacturers involved with private (commercial) and public (government, including defense) customers is increasing dramatically, even after many years of contraction of prime and second-tier manufacturers in the defense industrial base. Over approximately the last 20 years, the number of US-based Small to Medium Enterprise (SME) defense industry manufacturing suppliers has been reduced from 130,000 to 30,000 due to, among other things, mergers and acquisitions by major defense contractors. That contraction has resulted in the direct and indirect elimination of more than two million jobs in the defense sector. In addition, the associated pricing pressures have produced the effect of extending the necessary useful life of many product types, including critical weapon systems, not only because of order reductions, but because of reduction in research and development spending and the procurement of fewer new products. For example, many aircraft in the current operational Air Force are more than 20 years old. Those and other defense systems are expected to be useable for much longer periods of time, while the availability of replacement parts for those systems diminishes as the number of replacement parts required drops over that time period while remaining a critical need to ensure that the system at issue remains viable for its expected service life. Increasingly then, the lack of spare or replacement parts renders large portions of relatively old systems, such as Air Force aircraft, to be unavailable for operation.

Most Prime (direct contractual relationship with the customer) and Original Equipment Manufacturing (OEM) contractors have recognized these pressures and are defining new strategies that will dramatically change the requirements for the supply chain and suppliers within that chain. For example, the aerospace and defense and commercial Primes and OEMs are transforming themselves from original manufacturers into final assemblers in response to:

increased competition in both commercial and defense sectors;

downward cost pressures from the Department of Defense increased outsourcing to foreign suppliers The reconfiguration requires $1^{st}$ Tier suppliers to manage the bulk of the supply chain and requires $2^{nd}$ and $3^{rd}$ Tier suppliers to convert their operations to high mix/low volume production and upgrade the skill sets of their production workers. In fact, the aerospace industry estimates that 50% of the U.S. aerospace suppliers will go out of business in the next 5 years if U.S.-based suppliers fail to make this conversion.

This would add to the job loss already experienced in the manufacturing sector.

This country's SME manufacturers have been the foundation for defense manufacturing supply chains. Yet, many SME manufacturers face significant barriers that prevent them from participating in the supply chains of today, and certainly of tomorrow. These barriers include complex legal and financial bid requirements; a lack of access to technology; the lack of a skilled workforce; the lack of an innovation culture; and the lack of a culture to strive for "continuous improvement." The most significant barriers are the inability to read and/or translate technical data packages into shop floor level manufacturing specifications and proper pricing and shortage of skilled workers. For example, a typical SME simply does not have the capabilities or skills to undertake this important first step—a step current Prime contractors practice on a regular basis. The small business then wastes 2-3 days creating a "best guess" estimate, which often ends up as a noncompetitive quote. This eliminates their chances of winning the bid and hopes of diversifying revenue sources.

The United States Department of Labor is projecting a shortage by 2012 of 44,000 machinists and Computer Numerical Control (CNC) operators, two of the most important skilled positions in the metals fabrication industry, an industry critical to the independence and capability of the country's defense industrial base. So far, efforts to meet this challenge have fallen short because the demand for increased skills is rising much faster than the capacity of companies, workers, or the nation's educational system to respond. As a result manufacturers are scrambling for workers who can adapt quickly to new tasks and new market demands. These skill deficiencies impair manufacturers' ability to maintain production levels to meet increasing customer demand, implement new productivity improvements, and/or begin new innovative quality initiatives. With a projected skills shortage in CNC programmers/operators and machinists and the difficulties in recruiting students to manufacturing, it will take several years to fill the skills gap—a time advanced manufacturing employers can not afford in a highly competitive global economy.

More generally, any consumer of relatively large products and/or relatively large quantities of products, such as the Department of Defense, Prime and OEM contractors, wishing to purchase a manufactured product, such as a tool, may have difficulty doing so if the quantity desired is relatively small. SME manufacturers generally prefer to fabricate products in relatively large quantities. Therefore, they may have no interest in bidding on a project for which the quantity sought by the consumer falls below some threshold. Alternatively, the SME manufacturer may charge very high prices for relatively small quantities, making it difficult for the consumer to justify the expense to purchase the product desired.

On the other hand, SME manufacturers may have an interest in filling the consumer's order in the quantity desired at a price less than a larger competitor manufacturer would charge. The difficulty lies in bringing together the interested consumer and the willing SME manufacturer under conditions that make the fabrication and sale of the product at an agreed-upon price worthwhile for both parties.

For those suppliers who provide goods and services to government entities, particularly the federal government, there are many administrative hurdles to overcome. Government bidding requirements and contracting terms can be complex and difficult to navigate. Many times, the suppliers tend to be relatively large organizations having the capability, time, and resources to review governmental bid requests and respond in a manner that makes the bid award possible. On the other hand, relatively small suppliers must either partner with a relatively large supplier having access to government contracting sources, or simply avoid bidding on government projects. That avoidance eliminates the aggravation associated with the complexity of the process. It also shuts out such suppliers from that type of business.

Therefore, in order to assist SME manufacturers to rapidly respond competitively to several bid requests on a daily basis, what is needed is a system and related method to enable them to read and analyze technical bid data packages and, where necessary, partner with manufacturers who can provide the complementary skills and production capacities to fulfill bid requirements. Further, what is needed is such a system and related method that enables SME manufacturers to translate such technical information into shop floor level manufacturing specifications and relatively accurate pricing. Yet further, what is needed is such a system and related method that enables SME manufacturers to produce materials responsive to the bid package within a short timeframe. What is also needed is a system and related method to allow SME manufacturers to partner together as needed or desired to provide the necessary full set of skills and production capabilities and capacities to fulfill any particular product requirements deemed desirable to bid on.

SUMMARY OF THE INVENTION

It is an object of the present invention to provide a system and related method to assist SME manufacturers respond competitively to several bid requests on a daily basis. Specifically, it is an object of the present invention to provide a system and related method to enable SME manufacturers to rapidly read and analyze technical bid data packages. Further, it is an object of the present invention to enable SME manufacturers to rapidly translate such technical information into shop floor level manufacturing specifications for any CNC machine using tool crib information specific to the manufacturer and relatively accurate pricing. Yet further, it is an object of the present invention to provide such a system and related method that enables SME manufacturers to rapidly produce materials responsive to the bid package within a short timeframe. Still further, it is an object of the present invention to enable SME manufacturers to partner together as desired to provide the necessary full set of skills and production capabilities and capacities to fulfill the requirements of bids of interest.

These and other objects are achieved with the present invention. The invention is a system and related method to establish a way for SME manufacturers to rapidly bid on several technical manufacturing projects on a daily basis in an accurate, cost-effective, and timely manner. The system includes a combination of steps and components associated with carrying out the steps for receiving bid package information in one or more forms, correlating that information with the particular manufacturer's facility and manufacturing operations arrangement, workforce, equipment, and materials information to output a manufacturing scheduling plan and estimate, and producing summary information responsive to the bid request. The system includes a translation function to translate, as necessary, the bid information into product information for any CNC machine using tool crib information specific to the particular manufacturer and usable by the particular manufacturer considering submitting a bid in response to a request for bids. The system further includes a product fabrication function to generate materials needs, and setup and machine operation instructions for any CNC machine for the fabrication of the product associated with the product information. Finally, the system includes a bid preparation function for the generation of a package of information responsive to the bid request and based on the manufacturer's materials requirements and manufacturing capabilities. An optional component of the system of the present invention is a coordinate measuring machine capable of scanning a physical product and creating a two-dimensional or three-dimensional rendering thereof, with relevant specification information to be inserted into the product fabrication function. This optional feature may be of particular value when fabrication of a product for which no engineering specifications or drawings are available.

The related method of the present invention includes a plurality of steps that may be done serially, in parallel, in varying orders, or any combination thereof. The first step of the method is to obtain the specifications for the desired product. The specifications may come in the form of a two-dimensional drawing, a three-dimensional physical specimen, and/or a representation of the product in a digital or analog storage medium, such as a computer disk or transferred computer program. Another step of the process is to establish the manufacturing capability information for the manufacturer with an interest in bidding on a proposal to manufacture the desired product including, for example, the types and numbers of manufacturing equipment under the control of the manufacturer. The desired product information is then associated with the manufacturer's operational capabilities including specific CNC machine and tool crib information. Next, a schedule of manufacturing operation is generated as a function of the manufacturer's available equipment and the product desired. An optional component of the system of the present invention is to partner the manufacturer with one or more manufacturers that have complimentary manufacturing capabilities and capacities to manufacture the product. Based on that information, the manufacturer is capable of determining the price to charge for the product requested by the consumer in the quantity desired. The pricing and timing of manufacture are then provided to the customer.

Whereas the bid process would have previously required the manufacturer many hours of manual labor to perform the engineering calculations required to manufacture the desired product in an economically feasible way and create a bid response, the system and related method of the present invention enables that capability with certainty in a much shorter time period. The manufacturer is therefore more likely to bid on several projects in one day thereby increasing the chances of winning a contract. The consumer, in turn, is more likely to obtain the desired product in the quantity sought than would have occurred in the past when dealing with relatively larger suppliers having minimal interest in bidding on a product to be made in relatively small quantities and, therefore, of little relative economic value.

The present invention is a system and related method that enable a manufacturer to rapidly respond competitively to several requests for proposals daily to manufacture desired products in a timely and price competitive manner and with confidence that the estimate to complete the project is reliable. These and other advantages of the present invention will become apparent upon review of the following detailed description, the attached drawings, and the appended claims.

DETAILED DESCRIPTION OF THE PREFERRED EMBODIMENT

Figure 1:
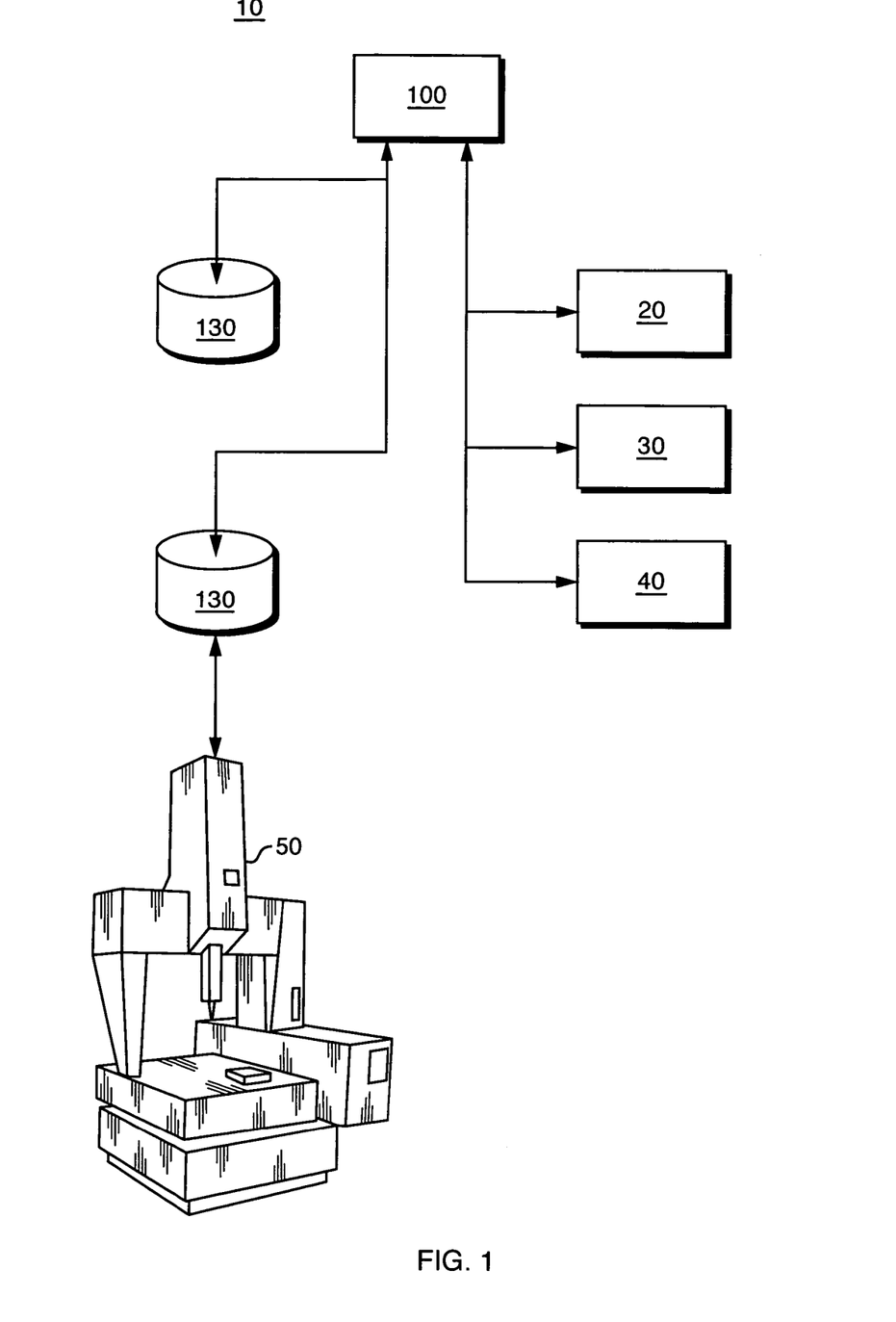
FIG. 1 is a block diagram of the functional elements of the system of the present invention.

As represented in FIG. 1, the present invention is a bid response system 10 and related method to enable manufacturers, particularly SME manufacturers but not limited thereto, to rapidly respond to several requests for proposal daily of the fabrication of products. The system 10 includes a translation function 20, a product fabrication function 30, a bid preparation function 40, and an optional coordinate measuring machine 50. A computer system 100 is preferably used as the means by which the functions described, along with one or more databases 130, to store and query information and produce bid information. The translation function 20 is configured to translate the bid information into product information usable by the particular manufacturer considering submitting a bid in response to a request for bids. The product fabrication function 30 is configured to generate materials needs, tool crib instruction requirements, computer programming codes suitable for the operation of the equipment selected, as applicable, and setup and machine operation instructions for the fabrication of the product associated with the product information.

The bid preparation function 40 is configured to generate a package of information responsive to the bid request, based on the manufacturer's materials requirements and manufacturing capabilities. This package of information typically includes one or more three-dimensional renderings of the product to be made, one or more setup instruction sheets comprising machining instructions for the manufacturer's specific machine(s), and any applicable computer codes required for operation of the manufacturer's specific machine (s). The optional coordinate measuring machine 50 may be used to generate drawing and detailed featured information for a product to be manufactured, with the information produced storable in the database 130. One or more of the identified functions may be established as discrete components, or parts of one or more common components. They may be coupled together as module components in any combination of hardware, firmware, software, microcode or any combination thereof.

Figure 2:
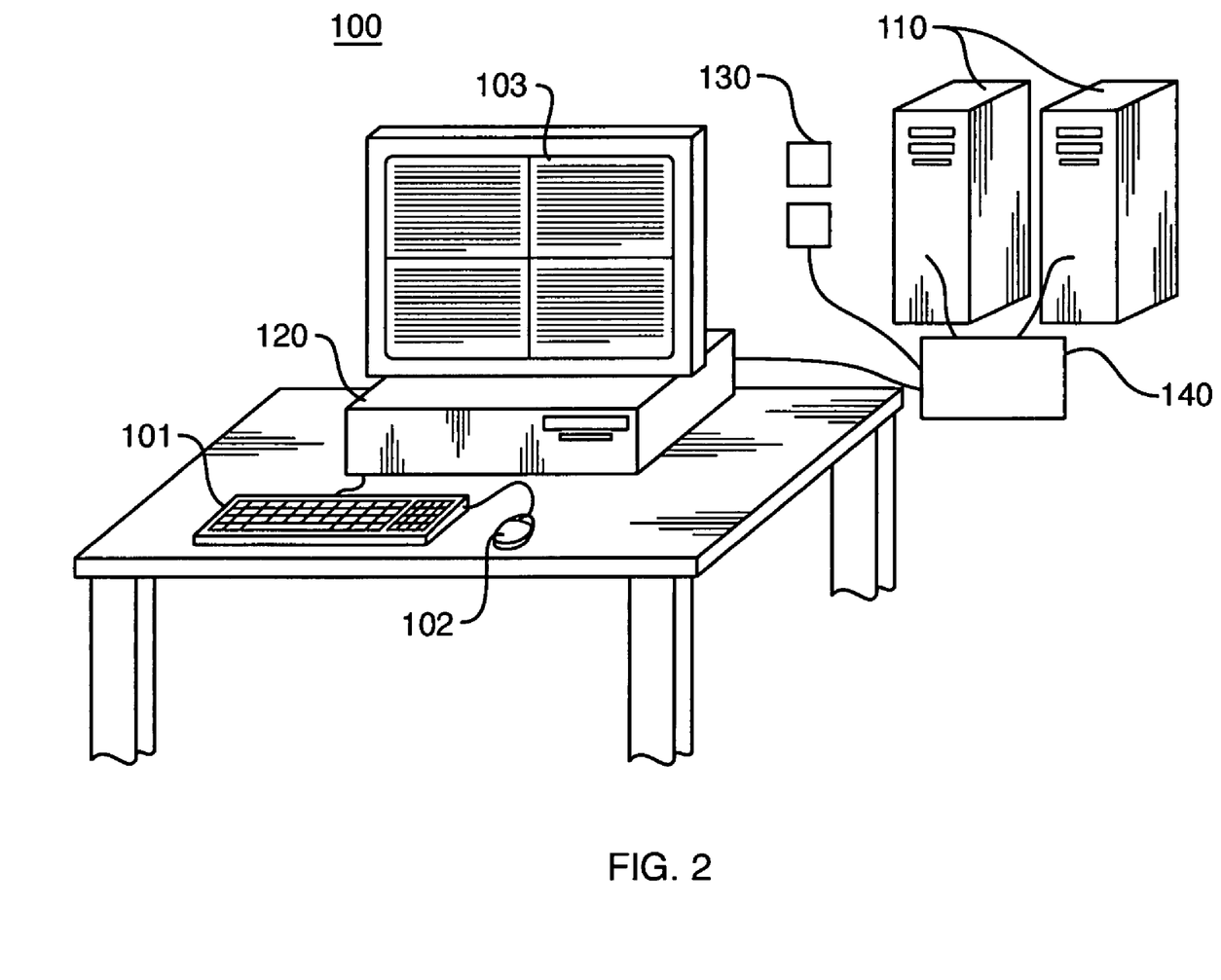
FIG. 2 is a simplified diagrammatic representation of an example computing system including the bid response system of the present invention.

As illustrated in FIG. 2, a user of the bid process system 10 may engage in a bid package formation through the computer system 100 that may be associated with local or remote computing means, such as one or more central computers, such as server 110 in a local area network, a metropolitan area network, a wide area network, or through intranet and internet connections. The computer system 100 may include one or more discrete computer processor devices, represented by desktop computer 120, for example. The computer system 100 may include computer devices operated by the manufacturer (i.e, desktop, laptop, servers, or CNC machines), and/or one or more providers of services to assist in the bid response generation method. The server 110, the computer processor 120, or a combination of both may be programmed to include one or more of the functions of the system 10. One or more databases represented by database 130 that may be associated with the server 110, the computer processor 120, other computing devices, or any combination thereof, include information related to the use of the bid process system 10. For example, the database 130 may include information regarding interested, available, or capable manufacturers, manufacturer manufacturing equipment operational details, potential customers for such manufacturers, and bid generation information, such as raw materials prices, for example. The database 130 may be populated and updated with information provided by an application provider capable of carrying out one or more of the steps associated with the bid process system 10, one or more manufacturers, or any other information providers. All of the devices may be interconnected through one or more signal exchange devices, such as router/switch 140.

In operation, a user of the bid process system 10 inputs bid-related information through one or more input devices, such as a keyboard 101, a mouse 102, or a combination thereof, as well as any other input means suitable for directing bid-related information and requests to the server 110 and/or the processor 120. The input information, queries, and output information may be viewed on a computer display 103. Optionally, a local or remote printer 104 may be employed to print out input information, query information, and/or output information. For purposes of this description, query information may include, but not be limited to, questions regarding products to be manufactured, bid details, and manufacturer information. Output information may include, but not be limited to, product specifications, bid details, fabrication scheduling and pricing, tool crib specific information to the manufacturer's machine(s), one or more three-dimensional renderings of the product to be manufactured, one or more setup instruction sheets, and bid package details. It is to be noted that the bid process system may be accessed and used through other forms of hardware devices including, for example, text/graphic scanner or reader inputs, touch-screen technology, voice recognition/synthesis equipment, other input/output devices, portable laptop, notebook, in-vehicle, or handheld personal digital assistant (PDA) portable computer devices, including those equipped for wireless communications, and telephony devices, such as wireless phones and IP-based phones.

Figure 3:
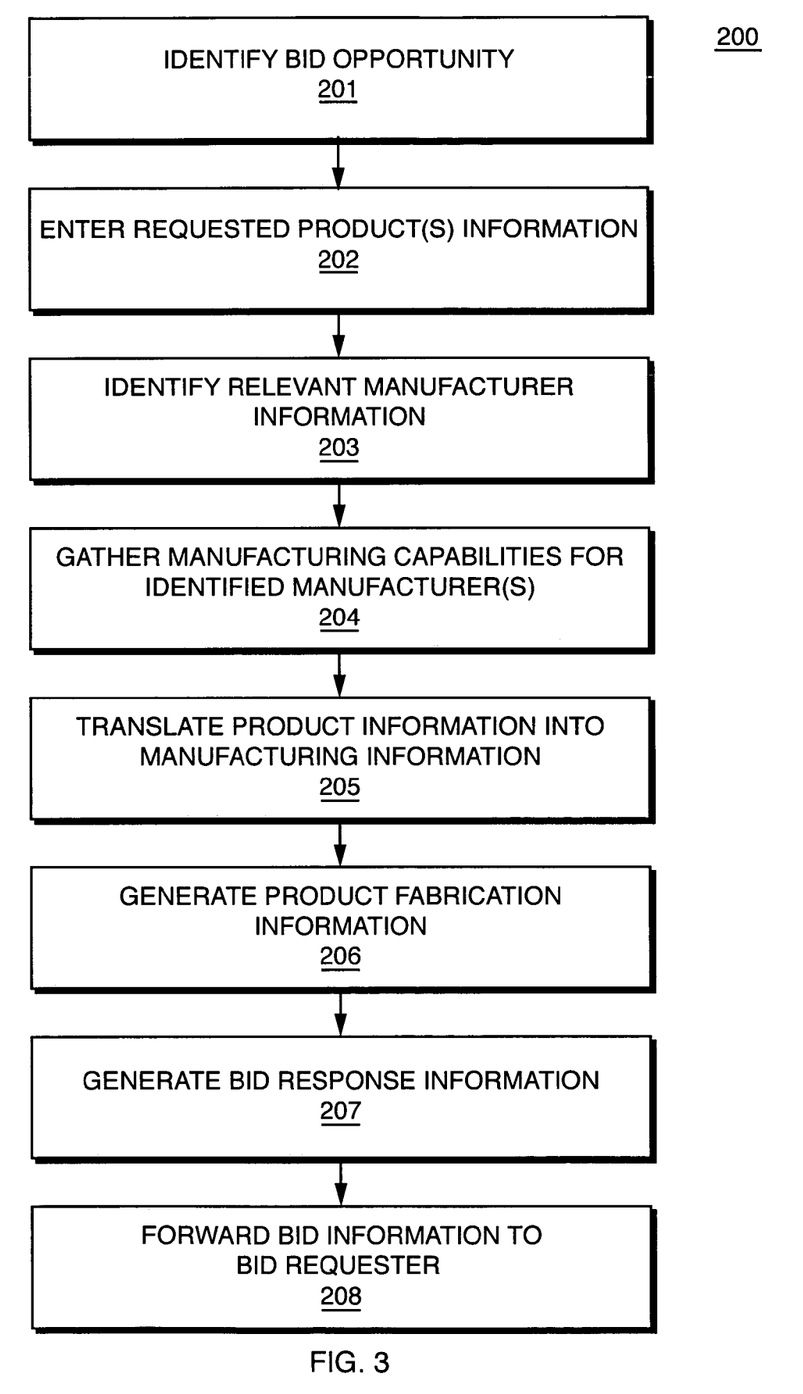
FIG. 3 is a simplified flow diagram representing the primary steps of the method of the present invention.

FIG. 3 provides a simplified block representation of the steps associated with the bid process system 10. It is to be understood that the steps described herein may be carried out through the identified functions of the system 10 as electronic functions performed through the computer system 100 based on computer programming steps. The functions configured to perform the steps described herein may be implemented in hardware and/or software. For example, particular software, firmware, or microcode functions executing on the computing devices can provide the translation (20), product fabrication (30), and bid preparation (40) functions. Alternatively, or in addition, hardware modules, such as programmable arrays, can be used in the devices to provide some or all of those functions, provided they are programmed to perform the steps described.

As illustrated in FIG. 3, an improved method for responding to requests for bids, the bid response method 200, includes several steps. First in step 201, a bid opportunity for the manufacture of one or more products is identified (step 201). Information associated with the manufacture of the product (s) is then entered into the system 10, such as through computer 100 or other means (step 202). Next, the database 130 is queried to identify one or more manufacturers deemed to be capable of manufacturing the product(s) (step 203). It is to be understood that a plurality of identified manufacturers may join together, or be joined together, to enable a complete response to the bid request. The manufacturing equipment capabilities of the one or more identified manufacturers are then identified (step 204). Next, the obtained product information is translated into information form that is compatible with the product manufacturing information required by the one or more identified manufacturers, preferably through the translation function 20 (step 205). The compatible product information is then associated with the product fabrication function 30 to generate product fabrication information relevant to the one or more identified manufacturers, such as machinery to be used, machinery settings, manhours required to fabricate the requested product(s), and cost of materials (step 206). Next, the product fabrication information is associated with the bid preparation function 40 to generate a bid responsive to the request for bid, including time to delivery and pricing, for example (step 207). The bid response information is then provided to the bid requester (step 208).

Figure 4:
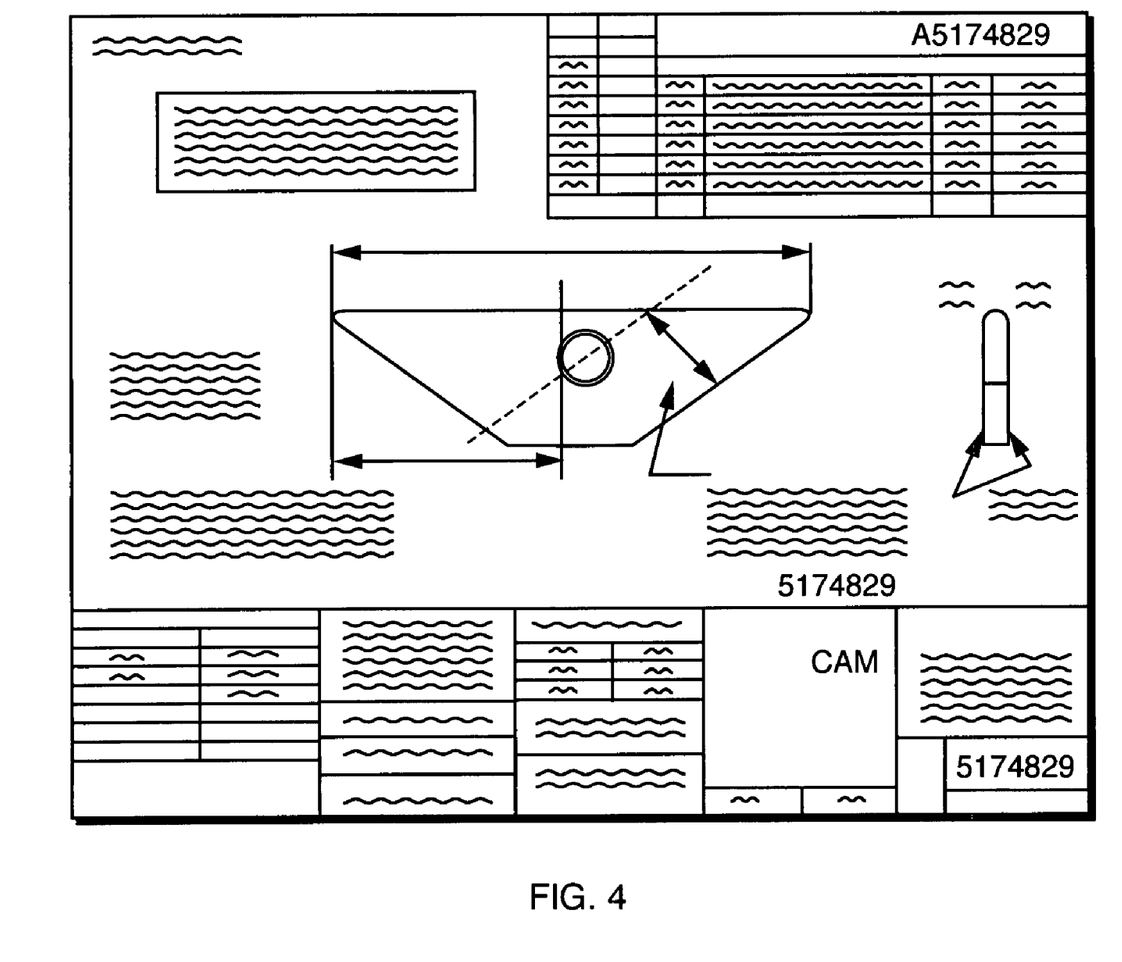
FIG. 4 is a representation of an example two-dimensional drawing of a product to be fabricated requiring an estimate of the pricing therefor.

The information regarding a product to be manufactured may come from a variety of sources. The information may be solicited or unsolicited. It may come from a private entity, such as an end-product manufacturer requiring a particular part, to a public entity, such as the Department of Defense seeking a replacement part for an old aircraft. The information is preferably stored in the database 130. The information gathered for insertion into the database 130 regarding the product or products to be manufactured may vary from written descriptions to rough sketches, to detailed blueprints to physical specimens. An example of a product information set is a two-dimensional blueprint, such as the example of FIG. 4. For products that are relatively old and for which no standardized manufacturing details or drawings are available, the physical specimen may be the only source of the product information. If so, the product may be photographed and a digitized depiction may be entered into the database 130. Optionally, the coordinate measuring machine 50 of FIG. 1, such as a Mitutoyo CMM available from Metal Essence, Inc. of Sanford, Fla., may be used to scan in the details of a product that may then be translated into structural specifications suitable for rendering drawings and machining instructions. The product information obtained, in whatever form, is entered into the database 130 through the computer system 100.

The database 130, which may be the same one storing the gathered product information, but which may alternatively be one or a plurality of other databases, is then queried to identify SME manufacturers who may have the capability to manufacture the product. The query made may be based on materials availability near the manufacturer, the number and type of pieces of manufacturing equipment located at the manufacturer's site or sites, the number and skill level of its employees, the availability to meet desired supply deadlines, the manufacturer's authorization to work on potentially sensitive products, such as for the Department of Defense, and the interest of the manufacturer in manufacturing the product. Other parameters. may be considered in the evaluation of the manufacturers to be identified. An example of a service provider with a store of manufacturers and their capabilities is the Maine Manufacturing Extension Partnership (Maine MEP) of Augusta, Me. The Maine MEP hosts a database of manufacturers under the trademark Supply Point™ through its New England Supply Chain Initiative, which database may be part of the database 130 of the system 10 of the present invention. That or other stores of manufacturer information may be used to identify relevant manufacturer information and the capabilities of the manufacturers identified. At that time, the manufacturer(s) identified may be contacted to determine their interest in bidding to produce the product. Alternatively, a manufacturer may have already notified the service provider that it is interested in bidding on projects that the provider has identified it for that purpose. The Supply Point™ program may be used to identify combinations of manufacturers that, in total, may be capable of fabricating the product.

Figure 5:
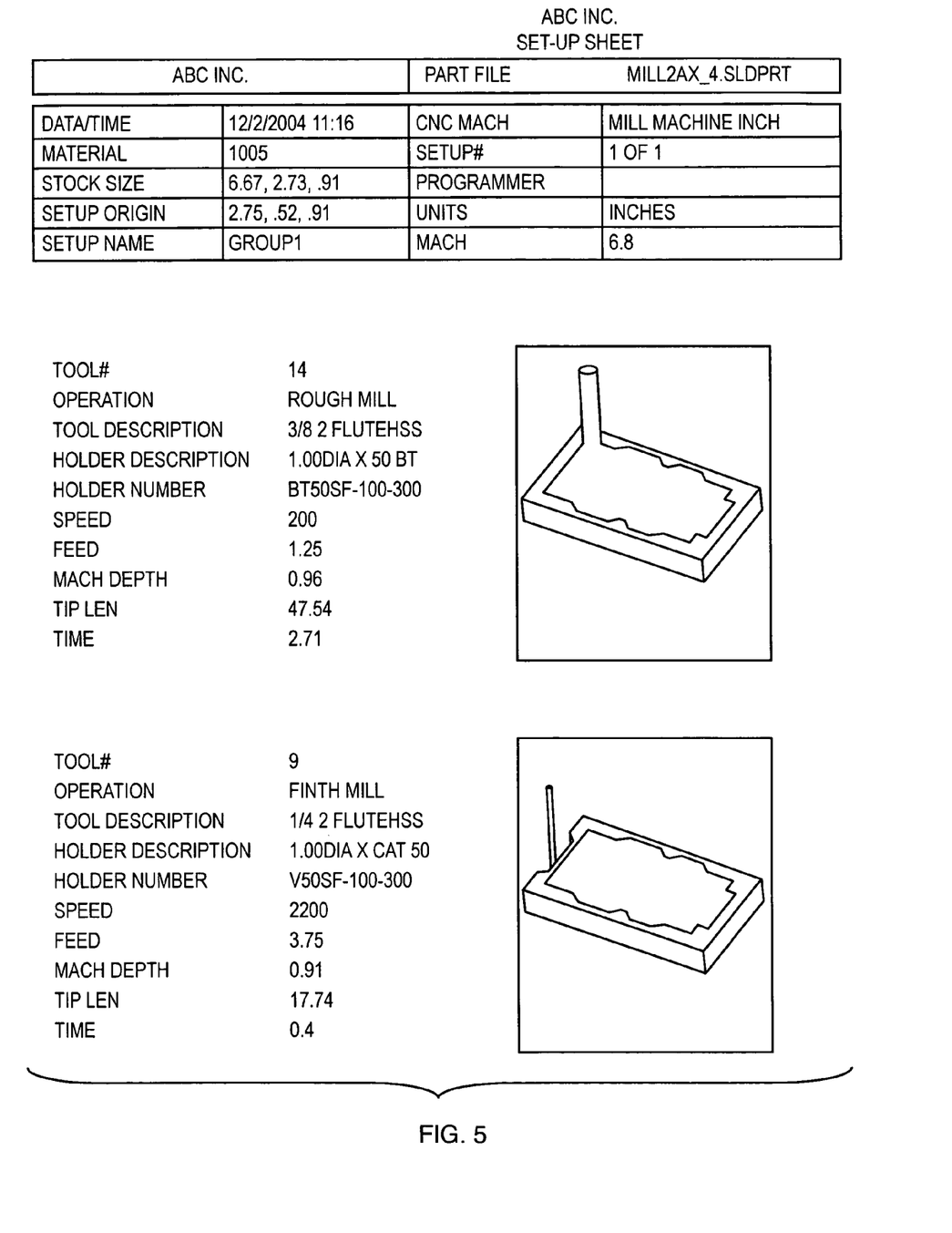
FIG. 5 is a representation of an example setup sheet representing the fabrication instructions for a part to be fabricated based on output from the product fabrication function.
Figure 6:
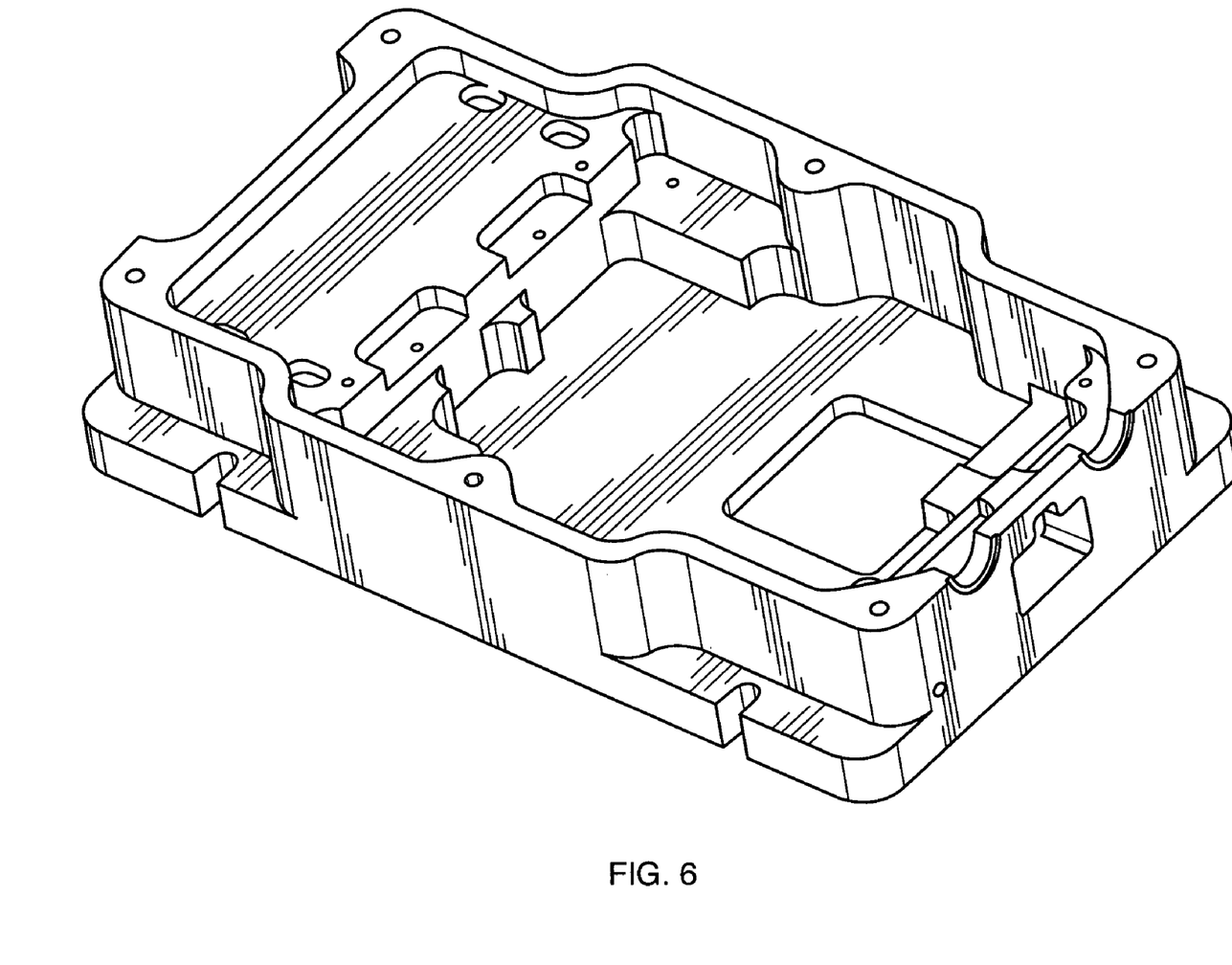
FIG. 6 is a simplified three-dimensional of a part to be manufactured based upon the setup sheet information shown in FIG. 5.

Upon identifying the relevant manufacturers and their manufacturing capabilities and notifying them of the bid request, the translation function 20 is activated through the computing system 100 to translate the product information into materials and machining instructions. One example of a computer program suitable to perform as the translation function 20 is the SolidWorks® 3-D mechanical design software available from the SolidWorks Corporation of Concord, Mass. The SolidWorks® software may be used to input the programming codes for a particular manufacturing machine, translate the gathered product information into manufacturing instructions for the machine, and output machining instructions for that machine. The software may be used to generate manufacturing details that enable the identified manufacturer to produce the product on machinery under its control. An example of a product manufacturing setup and fabrication instruction sheet output using the SolidWorks® software is presented in FIG. 5. A three-dimensional rendering of the example product to be fabricated using the instruction sheet of FIG. 5 is shown in FIG. 6. The information provided with the instruction sheet, along with the inputting of any required machine programming codes, may be used to determine the cost involved in making the example product of FIG. 6 for the purpose of generating a bid response. Of course, it is to be understood that this process may be employed to determine the manufacturing costs and functions required to produce products of other shapes and dimensions.

The output information from the translation function output is combined with the costs information provided by the particular manufacturer to generate through the product fabrication function 30 information regarding manpower requirements, machine usage requirements, quality control practices, scheduling, product output parameters and expected pricing. The product fabrication function 30 may be established in a computer program, such as through an Excel® spreadsheet or other means known to those skilled in the art of producing scheduling and pricing information. Finally, the information generated through the product fabrication function 30 is input to the bid preparation function 40 to generate information responsive to the bid request including, availability and pricing. The bid preparation function is preferably embodied in a computer program and is dependent upon the particular bid information particulars.

The bid response system 10 and related method of the present invention increases the likelihood that relevant and willing manufacturers will be contacted to produce products of interest. Further, the system 10 and related method improves the arrangement by which SME manufacturers may respond accurately and quickly to bid requests, including for products of relatively limited quantities and for which specification information may be difficult to acquire.

The steps of the method of the present invention, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components of system 100 described above and may be distributed across one or more such components. Further, the steps of the method represented in FIG. 3, may be performed in alternative orders, in parallel and serially.

It is to be understood that various modifications may be made to the system 10 and related method without departing from the spirit and scope of the invention. Accordingly, other embodiments are within the scope of the claims appended hereto.

What is claimed is:

1. A method to enable a rapid response to a request to bid on the manufacture of a product by a bid requester, the method comprising the steps of:
   a. obtaining information provided by a bid requester associated with the manufacture of the product;
   b. identifying, by one or more computer processors, the manufacturing capabilities of a plurality of manufacturers considered capable of manufacturing the product by querying a database of one or more manufacturers to produce a list of manufacturers capable of manufacturing the product;
   c. translating, by one or more computer processors, the information associated with the manufacture of the product into a format that is compatible with the identified capabilities of the plurality of manufacturers;
   d. generating, by one or more computer processors, product fabrication information specific to the manufacturers based on the product information provided by the bid requester;
   e. generating, by one or more computer processors, bid response information based on the generated product fabrication information for each of the plurality of manufacturers identified as capable of fabricating the product, including the identification of combinations of manufacturers capable of fabricating the product in partnership;
   f. contacting the identified manufacturers considered capable of manufacturing the product in partnership to determine their interest in bidding on the manufacture of the product; and
   g. providing to the interested manufacturers the bid request information and the product fabrication information specific to the interested manufacturers.

2. The method as claimed in claim 1 wherein the step of generating product fabrication information includes the step of establishing tool crib requirements and machining computer programming codes for one or more identified fabrication machines.

3. The method as claimed in claim 1 wherein the step of generating product fabrication information includes generating one or more machine setup instruction sheets.

4. The method as claimed in claim 1 wherein the product fabrication information includes the identification of one or more required machines, machinery settings, manhours required to fabricate, and cost of materials.

5. The method as claimed in claim 1 wherein the information associated with the manufacture of the product is a two-dimensional drawing of the product.

6. The method as claimed in claim 5 wherein the two-dimensional drawing is translated into a three-dimensional rendering of the product.

7. The method as claimed in claim 1 wherein the only information associated with the manufacture of the product is a physical specimen of the product.

8. The method as claimed in claim 7 wherein the physical specimen is rendered into a digitized format and translated into physical dimensions for generation of one or more machine drawings.

9. The method as claimed in claim 7 wherein physical dimensions of the physical specimen are generated using a coordinate measuring machine.

10. A system to enable a rapid response to a request to bid by a bid requester on the manufacture of a product, the system comprising:
  a. a translation function for translating information provided by the bid requester associated with the manufacture of the product into a format that is compatible with the manufacturing capabilities of one or more manufacturers
  b. a product fabrication function for generating product fabrication information based on the translated information;
  c. an updatable database of manufacturers with the interest and capability to manufacture products, wherein the database may be queried to identify such manufacturers;
  d. a bid preparation function for generating bid response information based on the product fabrication information, wherein the bid response information includes the identification of a plurality of manufacturers capable of fabricating the product in partnership, wherein the bid response information may be used to generate a list and initiate contact with the plurality of identified manufacturers considered capable of manufacturing the product in partnership to determine their interest in bidding on the manufacture of the product; and to provide to a plurality of interested manufacturers the bid request information and the product fabrication information specific to the interested manufacturers, and to generate a bid that may be accepted or rejected by the bid requester; and
  e. one or more computer processors, wherein the translation function, the product fabrication function, the bid preparation function, and the updatable database are embodied in one or more computer programs stored in one or more non-transitory computer readable mediums and are executed by the one or more computer processors.

11. The system as claimed in claim 10 wherein the database includes information of the equipment and required equipment operation information of the manufacturers.

12. The system as claimed in claim 10 wherein the only information provided by the bid requester is a physical specimen of the product to be manufactured, the system further comprising a coordinate measuring machine to produce physical dimensions of product information based only on the physical specimen.

13. The system as claimed in claim 10 wherein the product information includes a two-dimensional drawing and the translation function generates a thee-dimensional rendering of the product.

14. The system as claimed in claim 13 wherein the product fabrication function generates fabrication machine identification information, one or more setup instruction sheets for the identified machine, and machine programming codes.

15. The system as claimed in claim 14 wherein the hid preparation function produces output based on the machine identification information, the one or more setup sheets, and the programming codes, selected from the group consisting of product price, fabrication scheduling, three-dimensional product rendering, and selected machine information.

* * * * *